Dec. 20, 1960 E. C. CHERRY ET AL 2,965,709

SIGNAL TRANSMISSION SYSTEMS

Filed Nov. 20, 1957 6 Sheets-Sheet 1

Inventors:
Edward Colin Cherry
Michael Peter Beddoes
By: Stevens, Davis, Miller & Mosher
Attorneys Inventors:
Edward Colin Cherry
Michael Peter Beddoes
By: Stevens, Davis, Miller & Mosher
Attorneys Inventors:
Edward Colin Cherry
Michael Peter Beddoes
By: Stevens, Davis, Miller & Mosher
Attorneys Inventors:
Edward Colin Cherry
Michael Peter Beddoes
By:
Stevens, Davis, Miller & Mosher
Attorneys Inventors:
Edward Colin Cherry
Michael Peter Beddoes
By: Stevens, Davis, Miller & Mosher
Attorneys Inventors:
Edward Colin Cherry
Michael Peter Beddoes
By: Stevens, Davis, Miller & Mosher
Attorneys United States Patent Office 2,965,709
Patented Dec. 20, 1960

2,965,709

SIGNAL TRANSMISSION SYSTEMS

Edward Colin Cherry, South Kensington, London, England, and Michael Peter Beddoes, Vancouver, British Columbia, Canada, assignors to National Research Development Corporation, London, England Filed Nov. 20, 1957, Ser. No. 697,589

Claims priority, application Great Britain Nov. 20, 1956

9 Claims. (Cl. 178—6.8)

This invention relates to signal transmission systems and particularly to television systems and to picture facsimile transmission system.

In the normally-used television system a two-dimensional picture, at the transmitter, is scanned line by line to provide a picture signal which varies in amplitude corresponding to the brightness of the picture from point to point as the scanning spot moves along the scanned line. In this way the picture information is transformed into a picture signal which varies in amplitude with time. At the receiver, the picture is reconstructed by a scanning spot which produces on a screen a continuously moving spot of brightness corresponding to the amplitude of the picture signal. The scanning spot at the receiver is controlled to move in synchronism with that at the transmitter and line and frame synchronising signals are transmitted for this purpose.

Both scanning spots scan with constant velocity and the time taken to scan any line is constant. Successive pictures are scanned with sufficient frequency to avoid flicker and the system is thus effective for the transmission of still or moving pictures.

The quality of the reproduced picture is a direct function of the bandwidth of the vision channel by which the picture signal is transmitted and this bandwidth needs to be high for the accurate reproduction of sharp transitions in brightness which occur at the edges of surfaces of different brightness.

It is well-known that the bandwidth required by such a system is greatly in excess of the minimum bandwidth theoretically required by the information content of the picture and this is due to the fact that no real picture, having meaning to an observer, as distinct from a "noise" pattern, consists of a continuous rapid succession of brightness transitions, but consists of a number of areas of relatively constant brightness. It follows, therefore, that there exists the possibility of accurately reproducing a television picture with a system having a vision channel of smaller bandwidth than is customary.

Alternatively, there exists the possibility of retaining the same bandwidth of the transmission channel and transmitting the information in the original picture more quickly. This latter possibility is of particular relevance to facsimile picture transmission systems.

The object of the present invention is to provide a signal transmission system of restricted bandwidth providing the same picture definition as present systems using the conventional scanning arrangements.

According to the present invention, a signal transmission system for transmitting picture images comprises line scanning means for deriving a picture signal varying in amplitude with picture brightness, a time-base unit for controlling the velocity of line scanning, a filter arrangement and a detector arrangement for ascertaining when the instantaneous frequency of the picture signal exceeds a given frequency and thereupon to provide a signal to the time-base unit, whereby the velocity of scanning is reduced to limit the instantaneous frequency of the picture signal substantially at the given frequency.

In the above context, the term "instantaneous frequency" means the frequency of the picture signal as estimated from a sample of the signal energy during a period of very short duration but not shorter than about $$\frac{1}{2f_0}$$

where $f_0$ is the cut-off frequency of the filter arrangement used.

Furthermore, a signal transmission system comprising television transmission apparatus and television receiving apparatus has line scanning means, particularly a television camera tube, for deriving a picture signal varying in amplitude with picture brightness, a time-base unit for controlling the velocity of line scanning, a high-pass filter passing input signals of frequency above a given frequency and having said picture signal supplied to its input, a detector arrangement having the output of said high-pass filter connected to its input and having its output connected to the input of said time-base unit, the said time base unit providing a scanning spot position signal to the said line scanning means for controlling the velocity of line scanning at a lower value as the output of said detector arrangement is higher, a first transmission path transmitting frequencies up to at least the said given frequency to supply the picture signal to the television receiving apparatus and a second transmission path to supply a line scanning signal from the said time-base unit to the television receiving apparatus.

According to a preferred alternative form of the invention, a signal transmission system comprising television transmission apparatus and television receiving apparatus has line scanning means, particularly a television camera tube, for deriving a picture signal varying in amplitude according to picture brightness, a time-base unit for controlling the velocity of line scanning, a low-pass filter passing input signals of frequency below a given frequency and having said picture signal supplied to its input, subtractor means for comparing the said picture signal with the output signal of said low-pass filter and supplying a signal representative of the difference therebetween to the input of a detector arrangement, the output signal from said detector arrangement being supplied to said time-base unit, the said time-base unit providing a scanning spot position signal to the said line scanning means for controlling the velocity of line scanning at a lower value as the output from the said subtractor means is higher, a first transmission path transmitting frequencies up to at least the said given frequency to supply the picture signal to the television receiving apparatus and a second transmission path to supply a line scanning signal from the said time-base unit to the television receiving apparatus.

The said first and second transmission paths may comprise separate cables or they may comprise separate transmission channels using a single cable. Alternatively, they may include a radio link having separate transmission channels.

In order that the invention may be readily carried into effect, two embodiments will now be described in detail, by way of example only, with reference to the drawings accompanying this specification of which:

Figure 1:
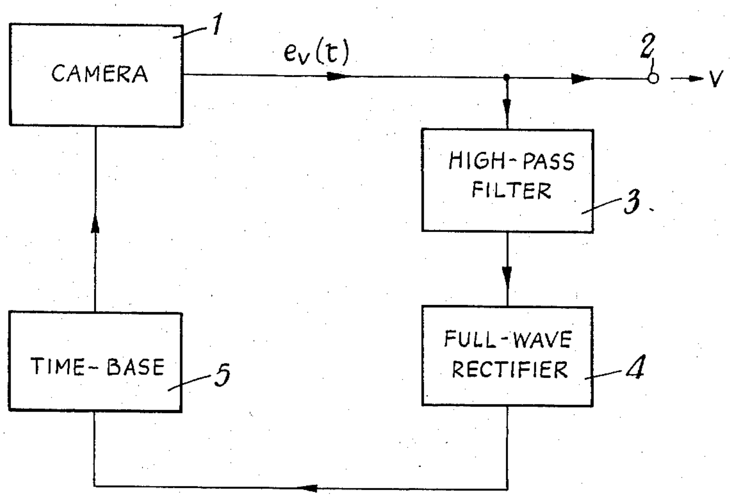
Figure 1 is a block schematic diagram of part of a transmitter of a television transmission system.

Figure 1 shows part of a television transmitter, in which the picture scanning means includes a camera 1 which may be of the type in which an image is projected by an optical system onto a photo-electric mosaic by forming a charge pattern thereon which corresponds point for point with the brightness of the projected image. This photo-electric mosaic is repetitively scanned line by line by an electron beam, the velocity of movement of the scanning spot along each scanned line being controlled by a time base 5. By this means, the charge pattern on the photo-electric mosaic is discharged element by element and provides a picture signal, the amplitude of which varies with time according to the charge pattern and hence according to picture brightness. The camera, together with its associated voltage supply and signal amplifying circuits, is well-known in present television systems and need not be further described for an understanding of the present invention.

The picture signal, having a value $e_v(t)$, is fed to a high-pass filter 3 having a sharp cut-off below a given frequency $f_0$. The output of the high-pass filter 3 therefore contains all the components of the short-term frequency spectrum of the picture signal having a frequency in excess of the frequency $f_0$. This signal is fed to a full-wave rectifier 4 to provide a fluctuating D.C. signal corresponding in amplitude to the average energy in the picture signal in the frequency spectrum above the frequency $f_0$. This fluctuating D.C. signal is fed to the time-base unit 5 which is controlled thereby so that, as the energy in the picture signal above the frequency $f_0$ increases, the velocity of the scanning spot of the camera 1 is decreased. Conversely, if the energy in the picture signal in the frequency band above $f_0$ decreases, the scanning velocity increases.

The system shown in Figure 1 therefore constitutes a closed loop, negative feedback system, the feedback signal being the picture signal energy above the frequency $f_0$. The variable feedback is maintained more constant, as is characteristic of negative feedback systems, and the picture signal is thus modified so that its frequency spectrum is substantially limited to the frequency band from 0 to $f_0$. This signal is supplied to the output terminal 2 for transmission along a vision channel generally indicated by the arrow V.

Figure 2:
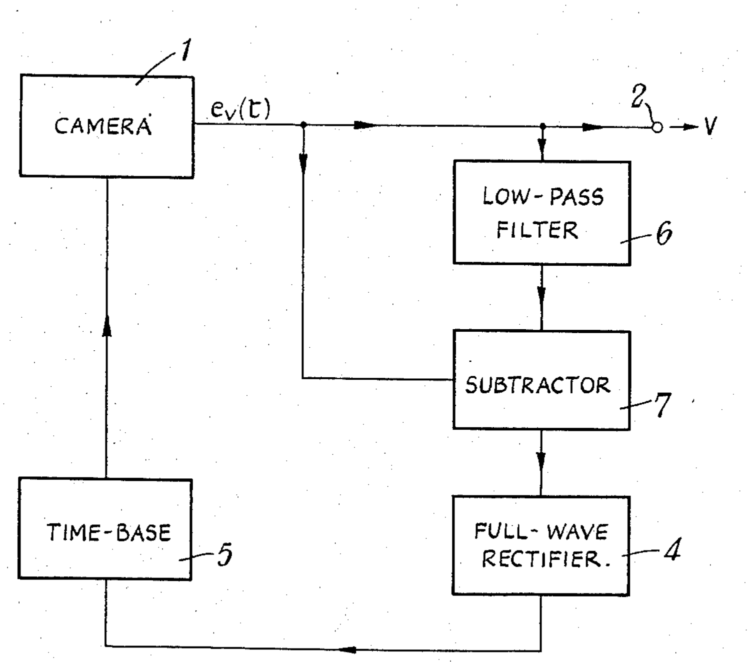
Figure 2 is a block schematic diagram showing a modified form of the arrangement shown in Figure 1.
Figure 4:
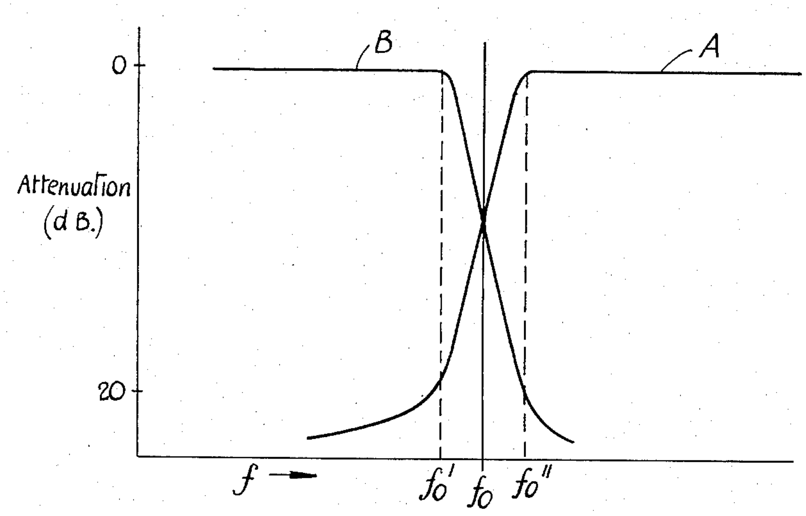
Figure 4 shows graphs of the amplitude versus frequency transmission characteristics of filters suitable for the systems of Figure 1 and Figure 2.

The low-pass filter used in a practical system according to Figure 2 necessarily has a frequency response as shown by the curve A in Figure 4. That is to say, the transition from the cut-off region to pass region does not occur immediately at the frequency $f_0$ but attenuation increases rapidly from the frequency $f_0''$ to the frequency $f_0'$. Ideally, the frequencies $f_0'$ and $f_0''$ should coincide with frequency $f_0$ and the transmission of the filter below that frequency be zero.

In the system shown in Figure 1, a certain delay occurs in the feedback loop and for this reason the system shown in Figure 2 is preferred.

In Figure 2, the high-pass filter of the system of Figure 1 is replaced by a low-pass filter 6 and subtractor 7, the output of which combination corresponds at any instant to the picture signal less that part of the picture signal passing the low-pass filter. The low-pass filter 6 is designed to cut off above the frequency $f_0$, so that the output from the subtractor 7 corresponds in amplitude to the picture signal part of frequency above the frequency $f_0$.

The low-pass filter used in a practical system according to Figure 2 necessarily has a frequency versus amplitude response as shown by the curve B of Figure 4. Attenuation increases rapidly with increase in frequency between $f_0'$ and $f_0''$. Ideally, the frequencies $f_0'$ and $f_0''$ should coincide with the frequency $f_0$ and the transmission of the filter above that frequency should be zero.

The output of the subtractor 7 rises, without delay being introduced, to the value of the picture signal $e_v(t)$, but diminishes as the slightly delayed low-pass filter output builds up. As regards the signal passed to the rectifier 4 and the time-base unit 5, the low-pass filter 6 and subtractor 7 combination has substantially zero time delay.

Figure 3:
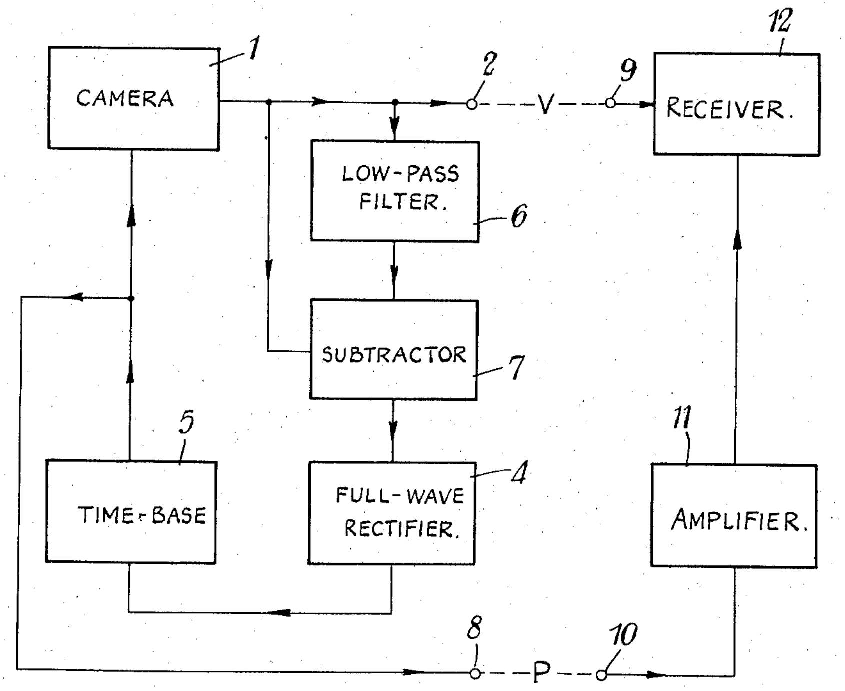
Figure 3 is a block schematic diagram of a complete television system using the transmitter arrangement of Figure 2.

A transmitter-receiver television system, including the transmitter arrangement of Figure 2, is shown in Figure 3. It is a two-channel system, having a vision channel V, of bandwidth up to the frequency $f_0$, and a further channel P, which will be referred to as the "position" channel.

In any television system, the reconstruction at the receiver of the picture image at the transmitter requires that the receiver scanning spot exactly reproduces the movement of the transmitter scanning spot. In known systems using constant velocity line scanning, this requirement is met by synchronising the commencement of each line scan in transmitter and receiver. In the system shown in Figure 2, however, the velocity of line scan is variable, depending upon picture detail, and is determined by the output of the time-base unit 5 as controlled by the rectified output of the subtractor 7. In the system of Figure 3, the output of time-base unit 5 is fed not only to the camera 1 but also to the terminal 8 which is the input terminal of the "position" channel P.

The vision channel V extends between terminals 2 and 9, the latter being connected to the input of a receiver 12. The position channel P extends between terminals 8 and 10, the latter being connected to an amplifier 11, the output of which controls the line scan of receiver 12.

By this means, information defining the position at any instant of the transmitter scanning spot is conveyed to the receiver. Because this information is separately derived and separately transmitted, in contrast from being derived from the picture signal, errors due to noise or signal distortions are not integrated to produce cumulative error along the length of each line scanned.

It has been found from experiment that a system as shown in Figure 3 can provide a practical working bandwidth compression of 4.7:1 in a television signal for which the maximum theoretical compression possible is 5:1. It has further been found that the position channel requires a smaller bandwidth than the vision channel and that about a third of the vision channel bandwidth will suffice, that is, in the above practical example, a channel having an upper frequency limit of about $$\frac{f_0}{3}$$

Figure 5:
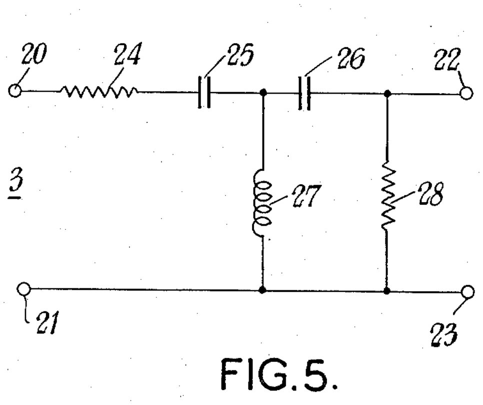
Figure 5 is a circuit diagram of a suitable high-pass filter for the system of Figure 1.

Figure 5 shows the circuit arrangement of a suitable high-pass filter for the unit 3 of Figure 1. The high-pass filter of Figure 5 is a four-terminal network having input terminals 20, 21 and output terminals 22, 23. The terminals 21 and 23 are directly connected. The terminals 20 and 22 are connected through the series combination of resistor 24, capacitor 25 and capacitor 26. The junction of capacitors 25 and 26 is connected through an inductor 27 to the line between terminals 21 and 23 and the same line is connected by way of resistor 28 to the junction between capacitor 26 and terminal 22. This high-pass filter has a frequency transmission characteristic of the form shown by the graph A in Figure 4.

The output picture signal from camera 1 is applied to the input terminals 20 and 21 of the filter and the output terminals 22 and 23 are connected to the input terminals of a full-wave rectifier of the form described below with reference to Figure 7.

Figure 6:
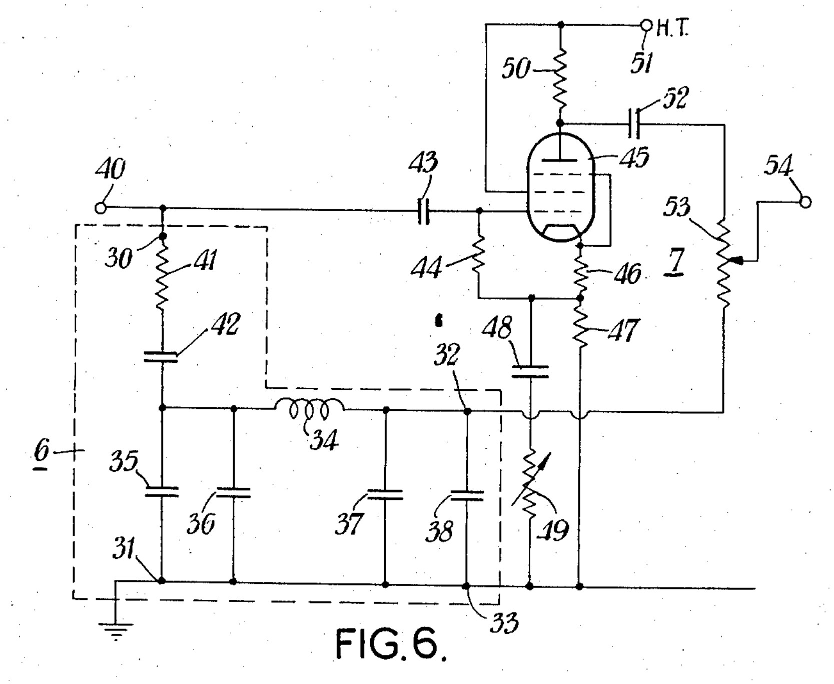
Figure 6 is a circuit diagram of a combined low-pass filter and subtractor arrangement for the systems of Figure 2 and Figure 3.

The preferred alternative to the high-pass filter shown in Figure 5 is the low-pass filter and subtractor combination shown in Figure 6, which corresponds to the low-pass filter unit 6 and subtractor unit 7 of the system shown in Figure 2.

As shown in Figure 6, an input terminal 40 to the low-pass filter and subtractor combination is connected to the camera 1 and to the vision channel V.

The low-pass filter 6 is a four-terminal network having input terminals 30 and 31 and output terminals 32, 33. Terminals 31 and 33 are connected together and to earth. Terminal 30 is connected through the series combination of a terminating resistor 41 and a blocking capacitor 42 to the junction of a series inductor 34 and parallel-connected shunt capacitors 35 and 36. The other sides of capacitors 35 and 36 are connected to terminal 31 and the other end of inductor 34 is connected to terminal 32. Parallel-connected shunt capacitors 37 and 38 are connected between the output terminals 32 and 33.

Terminal 40 is connected to the input of subtractor unit 7 at capacitor 43 which is connected to the control grid of a pentode valve 45.

The valve 45 has its cathode connected through series resistors 46 and 47 to earth. A grid leak resistor 44 is connected from the grid of valve 45 to the junction of resistors 46 and 47. The same junction point is connected by way of series capacitor 48 and variable resistor 49 to earth. The anode of valve 45 is connected by way of anode resistor 50 to a high-tension power supply at terminal 51. The screen of valve 45 is connected directly to terminal 51. The anode of valve 45 is connected by way of a series capacitor 52 to one end of a potentiometer 53 the other end of which is connected to the output terminal 32 of the filter 6. The variable tap of potentiometer 53 is connected to output terminal 54. The output of the low-pass filter and subtractor combination is derived between terminal 54 and earth.

Figure 7:
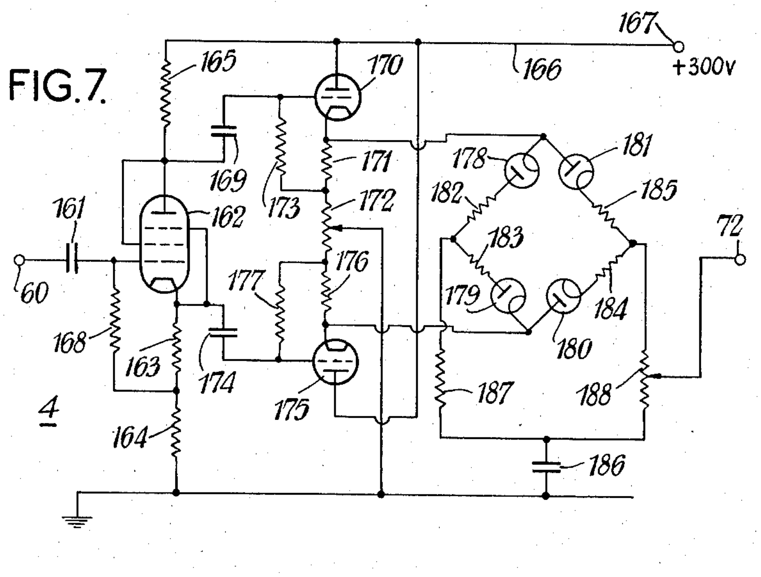
Figure 7 is a circuit diagram of a full-wave rectifier suitable for the systems of Figures 1 to 3.

The output at terminal 22 of the high-pass filter 3 or at terminal 54 of the subtractor 7, as the case may be, is connected to the input of full-wave rectifier 4, the circuit diagram of which is shown in Figure 7.

The rectifier 4 rectifies the input signal applied thereto, so that its output is independent of the input wave form being positive or negative. To this end, the rectifier 4 comprises bridge-connected rectifier elements. This form of rectifier requires a balanced supply and the rectifier unit therefore requires some form of unbalanced-to-balanced input which may be a suitable transformer or other phase-splitting arrangement.

In the rectifier shown in Figure 7, an input terminal 60 is connected by way of a series condenser 161 to the grid of a pentode valve 162 having its cathode connected by way of series connected resistors 163, 164 to earth and having its anode connected through resistor 165 to a high tension supply line 166 connected to a supply terminal 167 maintained at a voltage of +300 volts. The screen of valve 162 is connected directly to the anode and the grid is connected through grid resistor 168 to the junction of resistors 163 and 164. The anode of valve 162 is connected through series capacitor 169 to the grid of triode valve 170 having its anode connected directly to the high tension supply line 166 and having its cathode connected through a resistor 171 to one end of a potentiometer 172. The variable tap of potentiometer 172 is connected to earth. The grid of valve 170 is connected through grid resistor 173 to the junction between resistor 171 and potentiometer 172.

The cathode of valve 162 is connected through series capacitor 174 to the grid of a triode valve 175 having its anode connected directly to the high tension supply line 166 and having its cathode connected through a resistor 176 to the other end of the potentiometer 172. The grid of valve 175 is connected through a grid resistor 177 to the junction between resistor 176 and the potentiometer 172.

The cathodes of the two valves 170, 175 are connected to two opposite corners of a bridge-connected full-wave rectifier comprising diodes 178, 179, 180, 181 connected with series resistors 182, 183, 184 and 185 respectively in a bridge arrangement. The remaining opposite corners of the bridge are connected to earth by way of series resistors and a capacitor 186, the junction of resistors 182, 183 being connected through a resistor 187 and the junction of resistors 184, 185 being connected through a potentiometer 188 to one terminal of the capacitor 186, the other terminal of which is connected to earth. The variable tap of the potentiometer 188 is connected to the output terminal 72.

The pentode valve 162, having its output load divided between anode and cathode, serves as a phase-splitting valve for deriving the push-pull power amplifiers 170, 175. The input to the rectifier is applied at terminal 60, and the rectified output appears at terminal 72.

Figure 8:
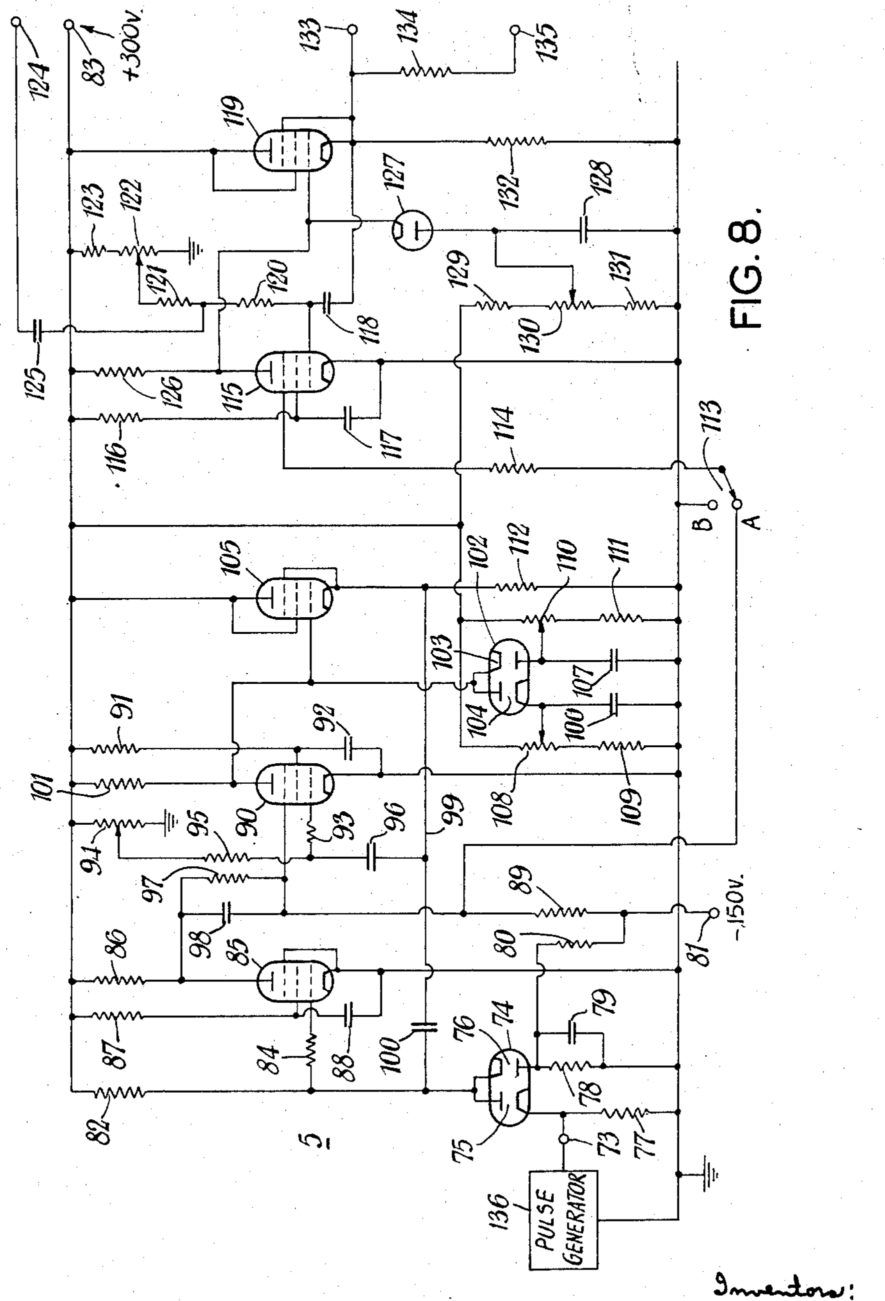
Figure 8 is a circuit diagram of a variable velocity time-base unit for the systems of Figures 1 to 3.

In either arrangement of Figure 1 or arrangement of Figure 2, the output of rectifier 4 appearing at terminal 72 is connected to the input of time-base unit 5. As shown in Figure 8, time-base unit 5 has an input terminal 73 connected to one end of a resistor 77, the other end of which is connected to earth. A double diode valve 74 has its diode sections 75 and 76 connected in parallel in reverse conductive sense. The cathode of diode 75 is connected to the input terminal 73 and the anode of diode 75 and the cathode of diode 76 are together connected by way of resistor 82 to terminal 83, to which is connected a high-tension supply of +300 volts. The anode of diode 76 is connected by way of the parallel combination of resistor 78 and capacitor 79 to earth, and also, by way of resistor 80, to a terminal 81, which terminal is maintained at a potential of −150 volts. The anode of diode 75 and cathode of diode 76 are also connected by way of grid resistor 84 to the control grid of a pentode valve 85.

The cathode of valve 85 is connected directly to earth and the anode of valve 85 is connected through anode resistor 86 to the high-tension supply at terminal 83. The screen of valve 85 is connected through dropping resistor 87 to terminal 83 and through capacitor 88 to earth. The anode of valve 85 is connected through the parallel combination of resistor 97 and capacitor 98 to the suppressor of a second pentode 90 which suppressor is also connected through a resistor 89 to the terminal 81.

The valve 90 has its screen connected through dropping resistor 91 to terminal 83 and connected by capacitor 92 to earth. The control grid of valve 90 is connected through grid resistor 93 to the junction of resistor 95 and capacitor 96. The other end of resistor 95 is connected to the variable tap of a potentiometer 94, the ends of which are connected between terminal 83 and earth. The other end of capacitor 96 is connected to the line 99 which is also connected by way of capacitor 100 to the anode of diode 75 and cathode of diode 76. The anode of valve 90 is connected through anode resistance 101 to terminal 83. A double diode 102 has its two diode sections connected in parallel in opposite conductive sense. The anode of valve 90 is connected to the anode of diode section 104 and cathode of diode section 103 and also to the control grid of a third pentode 105.

The cathode of diode 104 is connected to earth through capacitor 106 and to the variable tap of a potentiometer 108. One end of potentiometer 108 is connected to the high-tension supply at terminal 83 and the other end is connected through resistor 109 to earth. The anode of diode section 103 is connected to earth through capacitor 107 and also to the variable tap of a potentiometer 110. One end of potentiometer 110 is connected to the high-tension supply at terminal 83 and the other end is connected through resistor 111 to earth. The valve 105 has its screen and anode connected together and to the high-tension supply at terminal 83. The cathode of valve 105 is connected to earth by way of resistor 112 and also to the line 99.

The junction of resistor 97 and the capacitor 98 with resistor 89 is connected to one pole A of a changeover switch 113, the other pole B of which is connected to earth. The moving contact of switch 113 is connected through resistor 114 to the suppressor grid of a fourth pentode valve 115. The cathode of valve 115 is connected directly to earth. The screen of valve 115 is connected to terminal 83 through dropping resistor 116 and is connected to earth through capacitor 117. The control grid of valve 115 is connected to one side of a Miller capacitor 118, the other end of which is connected to the cathode of a fifth pentode 119. The control grid of valve 115 is also connected through series resistors 120 and 121 to the variable tap of potentiometer 122 having one end connected through series resistor 123 to the high-tension supply at terminal 83 and its other end connected to earth.

An input terminal 124 is conected by way of capacitor 125 to the junction of resistors 120 and 121. The anode of valves 115 is connected to the high-tension supply at terminal 83 by way of anode resistor 126. The anode of valve 115 is also connected to the control grid of valve 119 and to the cathode of a diode 127. A series combination of resistor 129 potentiometer 130 and resistor 131 are connected between the high-tension supply at terminal 83 and earth. The anode of diode 127 is connected to the variable tap of potentiometer 130. The anode and screen of valve 119 are together connected to the high-tension supply at terminal 83. The cathode of valve 119 is connected through resistor 132 to earth. The cathode of valve 119 is also connected to the output terminal 133 and by way of resistor 134 to the output terminal 135. In operation, the terminal 73 is connected to the output of a pulse generator 136 of frequency 1 kilocycle per second. This pulse generator may be of any convenient form and need not be further described for an understanding of the present invention. The output of the full-wave rectifier 4 is connected to input terminal 124. The output terminal 133 is connected to the input of an amplifier associated with the camera 31. The output terminal 135 is connected to the position channel P.

The time-base unit as shown in Figure 8 may be alternatively operated to provide a constant time duration of line scan or a constant length of line scan according to the position of switch 113. In order to provide constant-duration line scan, the switch 113 is set in position A as shown in the drawing. In this condition, the pentodes 85, 90 and 103 form a Sanatron circuit arrangement which is synchronised by the pulse input at terminal 73, the pulses fed in at terminal 73 initiating the time-base sweep. The velocity of the sweep is then determined by valves 115 and 119 which operate as Miller valves and are controlled by the signal fed in at terminal 124. The pentode 119 also forms a cathode follower output stage providing, across cathode resistor 132, a voltage signal which determines the scanning spot position along the line scanned. This voltage appears at terminal 133 for controlling the camera scanning and at terminal 135 for transmission to the receiver.

With switch 113 set in position B, that is with one end of resistor 114 earthed, the arrangement provides constant line-length line scan. In this condition, valves 85, 90 and 105 are inoperative. The Miller time-base provided by valves 115 and 119 generates a sweep voltage which increases until a certain threshold voltage is reached. This threshold voltage determines the length of the line scan irrespective of the total time taken.

Figure 9:
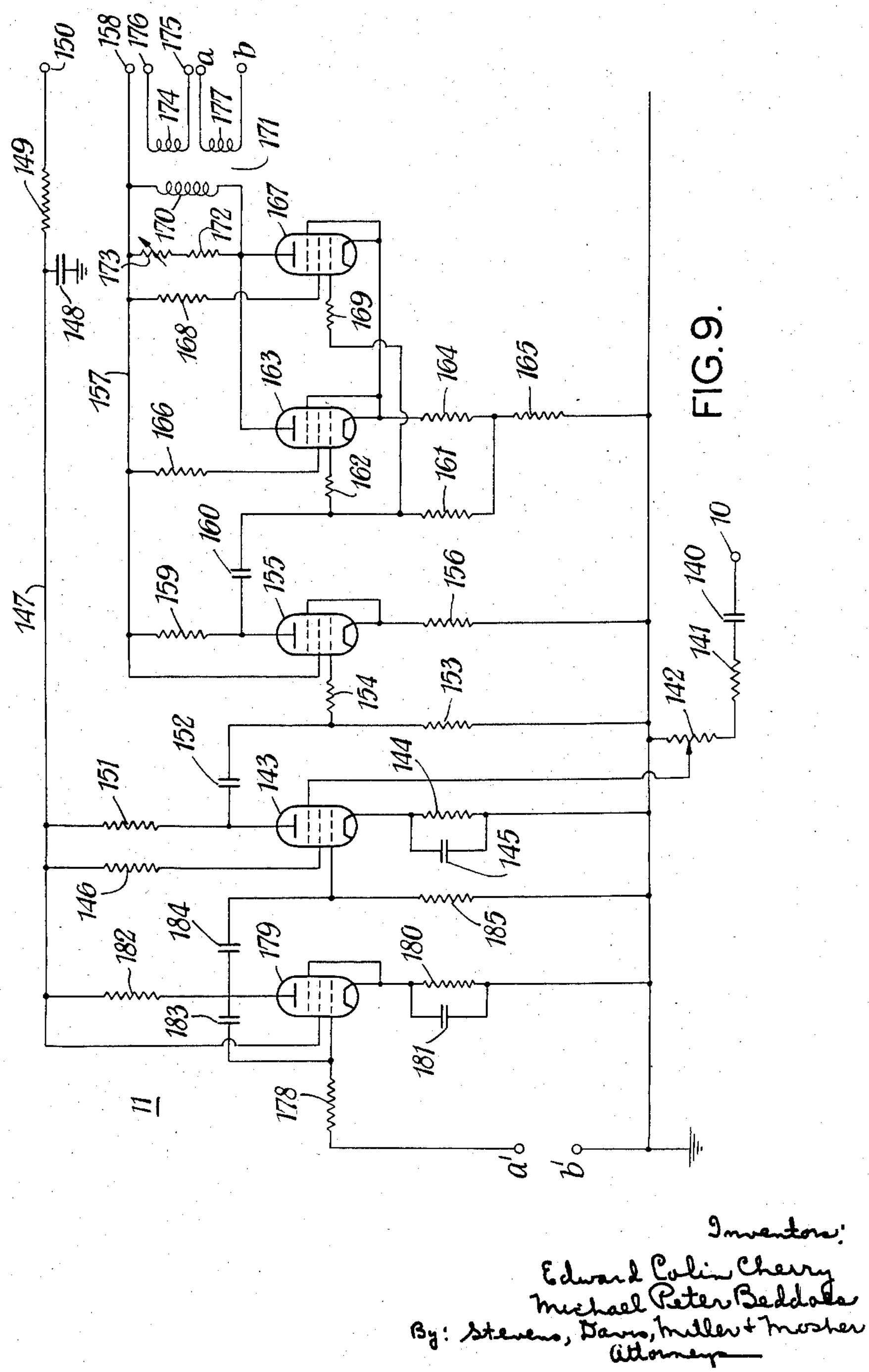
Figure 9 is a circuit diagram of an amplifier for supplying an amplified line scan deflection current to the reproduction tube of the receiver of the system shown in Figure 3 and to the camera tube of the systems shown in Figures 1 to 3.

As previously stated, the "position" channel P is connected to terminal 10, which is the input terminal of amplifier 11. The circuit diagram of a suitable amplifier 11 is shown in Figure 9. In the amplifier of Figure 9, the input terminal 10 is connected by way of series connected capacitor 140, resistor 141 and potentiometer 142 to earth. The variable tap of potentiometer 142 is connected to the suppressor grid of a pentode valve 143. The cathode of valve 143 is connected by way of the parallel combination of resistor 144 and capacitor 145 to earth. The screen of valve 143 is connected by way of resistor 146 to a first high-tension supply line 147. The supply line 147 is connected to earth through capacitor 148 and is connected through resistor 149 to a supply terminal 150.

The control grid of valve 143 is connected to the output of a feedback amplifier, described in detail below. The anode of valve 143 is connected through anode resistor 151 to the supply line 147 and is also connected by way of capacitor 152 and resistor 153 to earth. The junction of capacitor 152 and resistor 153 is connected through grid resistor 154 to the control grid of a pentode valve 155. The cathode of pentode 155 is connected through resistor 156 to earth. The screen of valve 155 is connected to a second high-tension supply line 157 which is connected to a supply terminal 158. The anode of valve 155 is connected through anode resistor 159 to the supply line 157 and is also connected by way of capacitor 160 to a load resistor 161. The junction of capacitor 160 and resistor 161 is connected through grid resistor 162 to the control grid of a further pentode valve 163.

The cathode of valve 163 is connected through series connected resistors 164 and 165 to earth. The lower potential end of resistor 161 is connected to the junction of resistors 164 and 165. The screen of valve 163 is connected through resistor 166 to the high-tension supply line 157. A pentode valve 167 is connected in parallel with the pentode valve 163, and the two valves have their anodes and cathodes strapped together. The screen of pentode 167 is connected through resistor 168 to the supply line 157. The junction of capacitor 160 and resistor 161 is also conected through grid resistor 169 to the control grid of valve 167. The anodes of valves 163 and 167 are connected through the primary winding 170 of an output transformer 171 to the supply line 157. The series combination of a fixed resistor 172 and a variable resistor 173 are connected in parallel with the primary winding 170. The transformer 171 has a secondary winding 174, having its ends connected to terminals 175 and 176. A monitor coil, comprising a secondary winding 177, has its ends connected to terminals *a* and *b*. The terminals *a* and *b* are connected respectively to the terminals *a'* and *b'* shown at the left hand side of the circuit diagram. The terminal *b'* is connected to earth and the terminal *a'* is connected through grid resistor 178 to the control grid of a pentode valve 179.

The valve 179 is a feedback amplifier and has its cathode connected through the parallel combination of resistor 180 and capacitor 181 to earth. The screen of valve 179 is connected directly to the high-tension supply line 147. The anode of valve 179 is connected through anode resistor 182 to the supply line 147. The anode of valve 179 is connected through capacitor 183 to the control grid of valve 179. The anode of valve 179 is also connected through the series combination of capacitor 184 and resistor 185 to earth. The junction of capacitor 184 and resistor 185 is connected to the control grid of valve 143.

The output terminals 175 and 176 are connected to the magnetic deflecting coils of a cathode ray tube included in the receiver 12.

An amplifier for amplifying the line scan deflection voltage is also included in the camera unit 1 of Figures 1, 2 and 3. This amplifier may conveniently be the same as that shown in Figure 9. In this case, the output voltage of the time-base unit 5 is connected to the input terminal of that amplifier corresponding to the terminal 10 of Figure 9. The output terminals of the amplifier, corresponding to the terminals 175 and 176 of the amplifier shown in Figure 9, are then connected to the magnetic deflection coils of the camera tube of the camera unit 1.

We claim:

1. A signal transmission system comprising picture transmission apparatus and picture receiving apparatus, said picture transmission apparatus comprising picture line scanning means for deriving a picture signal characterized by instantaneous frequency spectrum variation, a time-base unit providing a line scanning velocity control signal, a scanning control signal supply path extending from the time-base unit to the line scanning means, detector means connected to the time-base unit for supplying a time-base control signal thereto, filter means connected to receive the picture signal and to supply to the detector means a signal when the instantaneous frequency spectrum of the picture signal extends above a predetermined frequency, a first transmission path for transmitting to the picture receiving apparatus a frequency spectrum extending at least up to the predetermined frequency and a second transmission path extending from the scanning control signal supply path for transmitting the scanning control signal to the receiving apparatus.

2. A signal transmission system as claimed in claim 1, in which the filter means comprises a high-pass filter passing input signals of frequency above the predetermined frequency and having said picture signal supplied to its input and in which the detector means has the output of said high-pass filter connected to its input and its output connected to the input of said time-base unit, whereby the said time-base unit provides a scanning control signal to the line scanning means for controlling the velocity of line scanning at a lower value as the output of said detector means is higher.

3. A signal transmission system as claimed in claim 1, in which the filter means comprises a low-pass filter passing input signals of frequency below the predetermined frequency and having said picture signal supplied to its input, subtractor means for comparing the said picture signal with the output signal of said low-pass filter and for supplying a signal representative of the differences therebetween to the input of the detector means, the output signal from said detector means being supplied to said time-base unit, whereby the said time-base unit provides a scanning control signal to the line scanning means for controlling the velocity of line scanning at a lower value as the output of said detector arrangement is higher.

4. A signal transmission system as claimed in claim 2, in which the said detector means comprises a phase-splitting amplifier and a full-wave rectifier.

5. A signal transmission system as claimed in claim 3, in which the detector means comprises a phase-splitting amplifier and a full-wave rectifier.

6. For a signal transmission system, picture transmission apparatus comprising picture line scanning means for deriving a picture signal characterized by instantaneous frequency spectrum variation, a time-base unit providing a line scanning velocity control signal, detector means connected to the time-base unit for supplying a time-base control signal thereto, filter means connected to receive the picture signal and to supply to the detector means a signal when the instantaneous frequency spectrum of the picture signal extends above a predetermined signal, a picture signal output terminal for connection to a first transmission path and a scanning control signal supply path extending from the time-base unit to the line scanning means and to a control signal output terminal for connection to a second transmission channel.

7. For a signal transmission system, picture transmission apparatus as claimed in claim 6 in which the time-base unit is switchable to alternative modes of operation, the one to provide a constant time duration of line scan of said line scanning means and the other to provide a constant length of line scan thereof.

8. A signal transmission system comprising picture transmission apparatus, picture receiving apparatus and a first transmission path extending therebetween for transmitting picture signals in a frequency spectrum extending up to a predetermined frequency, said picture transmission apparatus comprising variable velocity picture-line scanning means including a time base controlled for varying the scanning velocity by a scanning control signal, extending from the first transmission path to the time base, including, in sequence, a high-pass filter and a detector, said high-pass filter passing components of the picture signal of frequency above said predetermined frequency and a second transmission path for transmitting the scanning control signal to the receiving apparatus.

9. A signal transmission system comprising picture transmission apparatus, picture receiving apparatus and a first transmission path extending therebetween for transmitting picture signals in a frequency spectrum extending up to a predetermined frequency, said picture transmission apparatus comprising variable velocity picture-line scanning means including a time base controlled for varying the scanning velocity by a scanning control signal applied from the output of a rectifier, circuit means, connected to the input of the rectifier for supplying thereto a signal representative of the energy in the picture signal lying above the predetermined frequency, comprising subtractor means having two inputs, one input having the picture signal supplied directly thereto and the other input having the picture signal supplied thereto through a low-pass filter passing components of the picture signal lying below said predetermined frequency, and a second transmission path for transmitting the scanning control signal to the receiving apparatus.

References Cited in the file of this patent

UNITED STATES PATENTS

| | | |
|---|---|---|
| 2,306,435 | Graham | Dec. 29, 1942 |
| 2,752,421 | Ross | June 26, 1956 |

FOREIGN PATENTS

| | | |
|---|---|---|
| 377,175 | Great Britain | July 19, 1932 |